United States Patent [19]
Fukuyama

[11] Patent Number: 5,602,481
[45] Date of Patent: Feb. 11, 1997

[54] SERIES CONNECTION CIRCUIT FOR SECONDARY BATTERY

[75] Inventor: Yuichi Fukuyama, Yokosuka, Japan

[73] Assignee: Nissan Motor Co., Ltd., Kanagawa-ken, Japan

[21] Appl. No.: 401,608

[22] Filed: Mar. 9, 1995

[30] Foreign Application Priority Data

Mar. 11, 1994 [JP] Japan .................................. 6-067888

[51] Int. Cl.$^6$ ............................................... G01N 27/416
[52] U.S. Cl. ........................................ 324/434; 324/426
[58] Field of Search .................................. 324/434, 435, 324/433, 426, 427

[56] References Cited

U.S. PATENT DOCUMENTS

| | | | |
|---|---|---|---|
| 3,942,104 | 3/1976 | Byrne | 324/434 |
| 5,170,124 | 12/1992 | Blair et al. | 324/434 |
| 5,302,902 | 4/1994 | Groehl | 324/434 |

FOREIGN PATENT DOCUMENTS

| | | |
|---|---|---|
| 61-206179 | 9/1986 | Japan . |
| 63-55868 | 3/1988 | Japan . |
| 4-331425 | 11/1992 | Japan . |

Primary Examiner—Louis M. Arana
Attorney, Agent, or Firm—Lowe, Price, LeBlanc & Becker

[57] ABSTRACT

Disclosed is a series connection circuit for secondary batteries for preventing a reduction of energy usable as the builtup battery due to a difference of DOD of the batteries and a difference of voltage detection level of voltage detectors. The circuit includes voltage detectors for detecting the terminal voltage of the secondary batteries thereby to calculate the respective values of DOD thereof, transistors for discharging the secondary batteries independently, a charging unit to charge the secondary batteries and a controller for controlling the independent discharging operation of the transistors corresponding to the respective values of DOD. With the arrangement mentioned above, it is possible to equalize the values of DOD, whereby the reduction of usable energy caused by the increasing of difference of DOD can be prevented.

7 Claims, 11 Drawing Sheets

SERIES CONNECTION CIRCUIT FOR SECONDARY BATTERY

BACKGROUND OF THE INVENTION

1. Field of the Invention

The present invention relates to a builtup battery consisting of a plurality of non-soluble type of secondary batteries, such as lithium ion secondary batteries, and more particularly, it relates to a series connection circuit for the secondary batteries, which enables to prevent the builtup battery including the non-soluble type of secondary batteries connected in series with each other from overcharging and overdischarging electricity.

2. Description of Related Art

Figure 1:
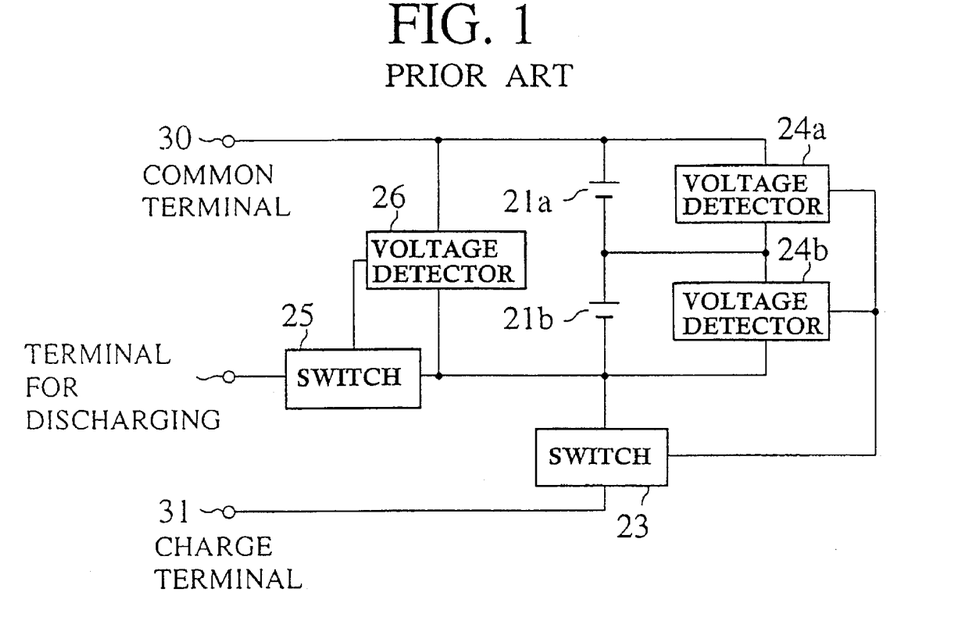
FIG. 1 is a view showing a conventional device for preventing batteries from overcharging and overdischarging.

In Japanese Unexamined Patent Publication (Kokai) Nos. 4-331425 and 61-206179, there are disclosed respective devices which prevent the non-soluble type of secondary batteries such as lithium ion batteries from overcharging and overdischarging the electricity. FIG. 1 shows a construction of the conventional device for preventing a builtup battery consisting of two lithium ion secondary batteries 21a and 21b connected with each other in series from overcharging and overdischarging.

Generally speaking, although the lithium ion battery has advantages of less self-discharge and higher charging efficiency, it is characterized by a "designed" voltage which is determined by a chemical reaction between active materials of anode and cathode and organic electrolyte and which is also called "the charge stop voltage". Therefore, in general, to charge the batteries in excess of the charge stop voltage is called the overcharging. Under this overcharging condition, it causes troubles of a precipitation of metallic lithium on the cathode, a precipitation of metallic cobalt or cobalt compounds precipitated due to a cobalt ion which may be produced by dissolution of the anodic active materials and a dissolution of the organic electrolyte. Consequently, the above troubles causes a problem of short circuit between the anode and the cathode and a deterioration of battery in performance. Therefore, from these points of view, it is necessary to exclude this overcharging problem from the builtup battery.

Similarly, to discharge the battery till below a dissoluble voltage (or "the discharge stop voltage") of electrode materials (e.g. Cu) is called the overdischarging. Under this overdischarging condition, since the ionized cupper (Cu) is dissolved to flow into the electrolyte, the current collecting function is so lowered that the active substances of the electrodes fall off. Consequently, although the extent of damage is somewhat small in comparison with that in the "overcharging" case, the overdischarging also causes a trouble of short circuit between the anode and the cathode due to the cupper ion dissolving into the electrolyte and a problem of reduction in the battery capacity.

In order to avoid the above overcharging and overdischarging problems, in the conventional device shown in FIG. 1, when charging the lithium ion secondary batteries 21a and 21b upon connecting a not-shown battery for charge with a common terminal 30 and a charging terminal 31 of the device and further switching on a switch 25, two voltage detectors 24a and 24b detect voltage-values of the batteries 21a and 21b, respectively. Then, as soon as either one of the detected values is in excess of a predetermined value, a switch 23 constituted by FET (Field Effect Transistor), SSR (Solid State Relay) or the like is switched off, whereby the current for charging the batteries is cut off to avoid the overcharging.

On the other hand, in case of discharging, upon switching on the switch 25, the discharging voltage value is checked by a voltage detector 26. Then, as soon as the detected voltage value is less than the dissoluble voltage of electrode materials, the switch 25 is switched off, whereby the overdischarging for the batteries 21a and 21b is avoided.

In the above-mentioned conventional device as shown in FIG. 1, however, the device is only constructed in such a manner that when the total voltage at discharging is less than the dissoluble voltage, then the discharging operation is stopped and when any one of the batteries contained therein amounts to the predetermined full voltage level during charging, then the charging operation is stopped. Therefore, the device has no function of restricting an increasing of a difference of "DOD" (Depth of discharge) values(%) of the batteries 21a and 21b. Note, in general, the difference of DOD values is caused by a difference of charging/discharging efficiencies between the respective batteries. The difference of charging/discharging efficiencies is derived from an unequal temperature distribution etc.

Figure 2:
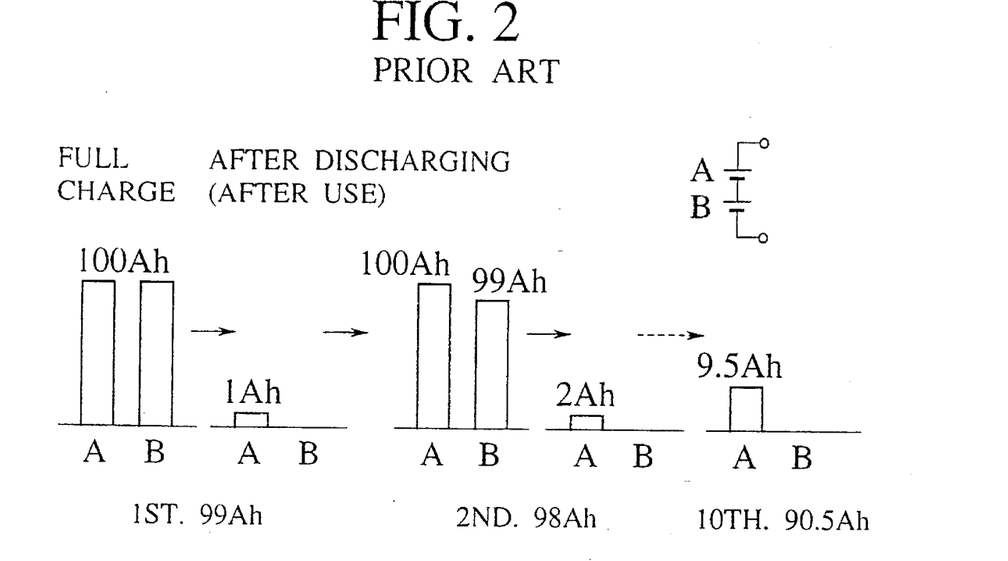
FIG. 2 is an explanatory diagram of charging/discharging efficiencies of the conventional device of FIG. 1.
Figure 3:
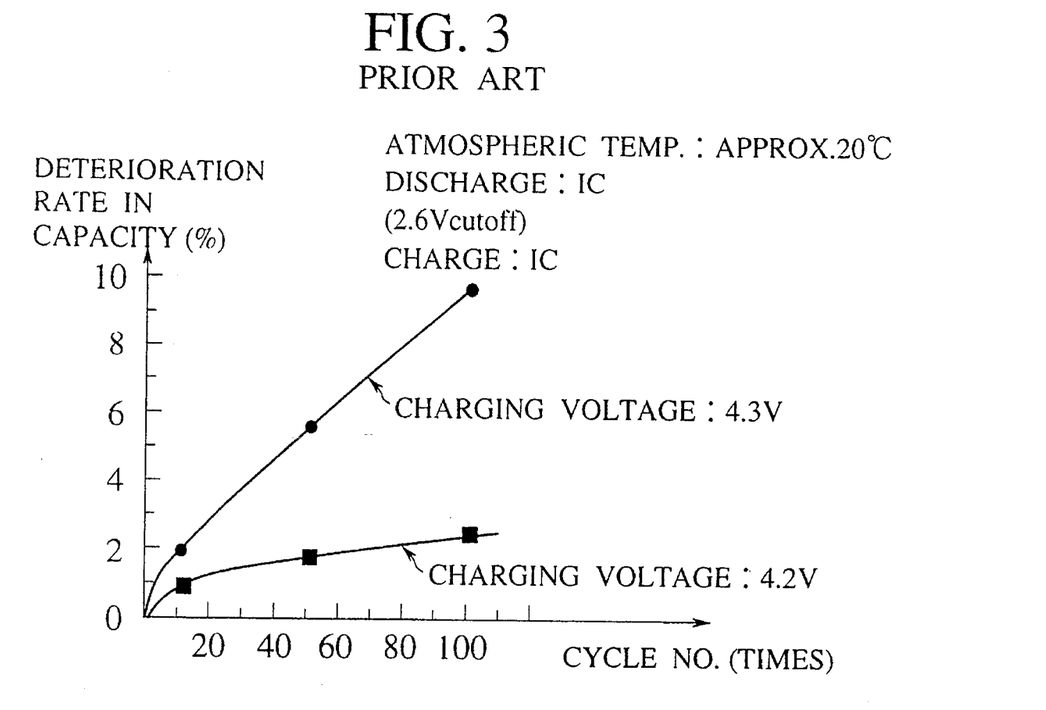
FIG. 3 is a diagram showing characteristic curves with overcharging cycles of the conventional battery.

We describe the difference of DOD in detail, with reference to FIG. 3 where one changing form of charging/discharging efficiencies is illustrated. When two lithium batteries A and B are used, connected in series with each other, the available battery capacity is restricted by the smaller one in battery capacity of the batteries A and B. Therefore, provided that both the battery A of a battery capacity of 100 Ah (Ampere/hour) at the first charging and L the battery B of a battery capacity of 99 Ah, of which difference is derived from the difference of DOD, are discharged together, there would be remained a uselessness of 1 Ah since the respective energy consumption are 99 Ah in both batteries A and B, as shown in a left part of FIG. 2. Similarly, after the tenth discharging operation has been finished, the uselessness of battery capacity in the battery A amounts to 9.5 Ah. In this way, corresponding to the increasing of the difference of DOD, a problem that total amounts of energy usable as the builtup battery is gradually decreased is raised.

Furthermore, the lithium ion secondary battery is characterized by a large deterioration rate of battery-capacity caused by overcharging. FIG. 3 shows an example of the change of deterioration rate of battery-capacity corresponding to numbers of overcharging cycle. It will be easily understood by the figure that, under condition that the charging is carried out with a constant current/constant voltage, a change of setting voltage from 4.2 V to 4.3 V, i.e., the changes by only 0.1 V, causes an abrupt increasing of the deterioration rate of battery-capacity from 2.5% to, approx. 10% at the discharging/charging of 100 cycles. This means that a life span of the battery is lowered to a quarter by a difference of 0.1 V (ratio: 2.4% for 4.2 V) in set voltage and that the life span is remarkably shortened by the increase of difference of DOD.

Figure 4:
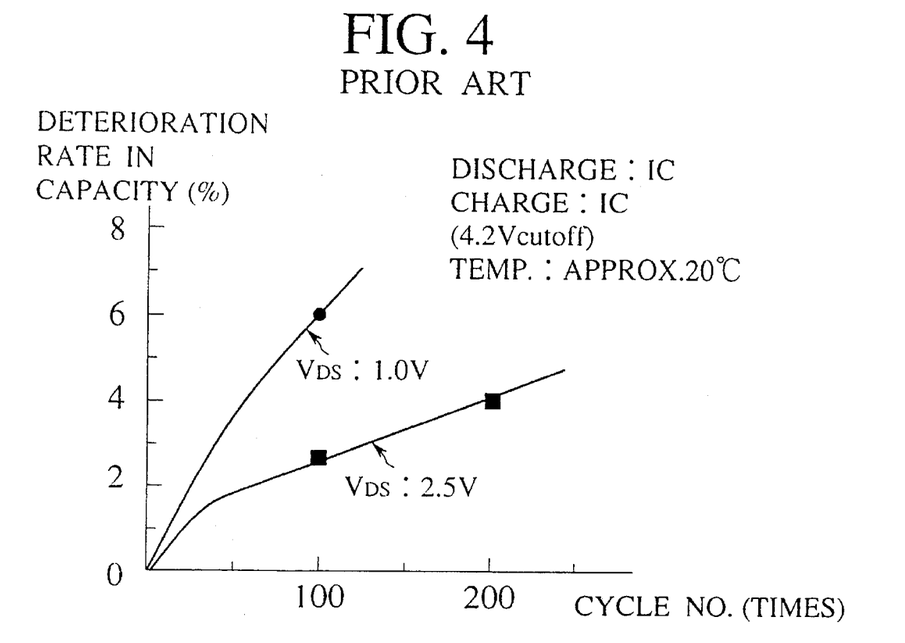
FIG. 4 is a diagram showing characteristic curves with charging cycles of the conventional battery.

Note that, in comparison with the deterioration of battery-capacity by overcharging, the lithium ion secondary battery has a small deterioration rate of battery-capacity by overdischarging. FIG. 4 shows an example of the change of deterioration rate of battery-capacity corresponding to numbers of overdischarging cycle. It will be easily understood by the figure that, even if the discharge stop voltage (dissoluble voltage) is changed from 2.4 to 1.0 V, the deterioration rate of battery-capacity changes by an increasing of from 2.5% to 6%. This means that the life span of the battery is lowered to only a half in spite of a difference of 1.5 V (ratio: 60% for 2.5V) in discharge stop voltage.

Figure 5:
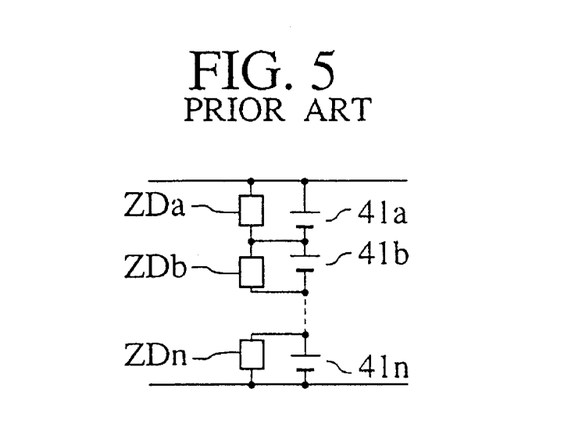
FIG. 5 is a view showing a conventional series connection circuit for builtup battery consisting of lithium secondary batteries.

FIG. 5 shows another conventional series connection circuit. The circuit includes a plurality of lithium secondary batteries 41a, 41b, . . . and 41n which are connected in series with each other. In the batteries, metallic lithium is employed for the cathodes and on the other hand, either activated carbon or titanium disulfide/manganese oxide is used for the anodes. In this circuit, in order to avoid a deterioration of the battery performance due to differences in charging character among the respective batteries, which is caused by the uneven distribution of charging-voltage to the batteries, constant voltage circuits (Zener Diode etc.) ZDa, ZDb, . . . and ZDn are connected in parallel with the batteries, respectively, to detect voltage values applied on the respective batteries.

With the above-mentioned arrangement, however, since the voltage values are detected by the constant voltage circuits connected in parallel with the respective batteries 41a, 41b, . . . and 41n, it is inevitable that, due to characteristic variance in and around the Zener diodes, a difference in voltage detecting character (level) among the respective batteries is produced.

Figure 6:
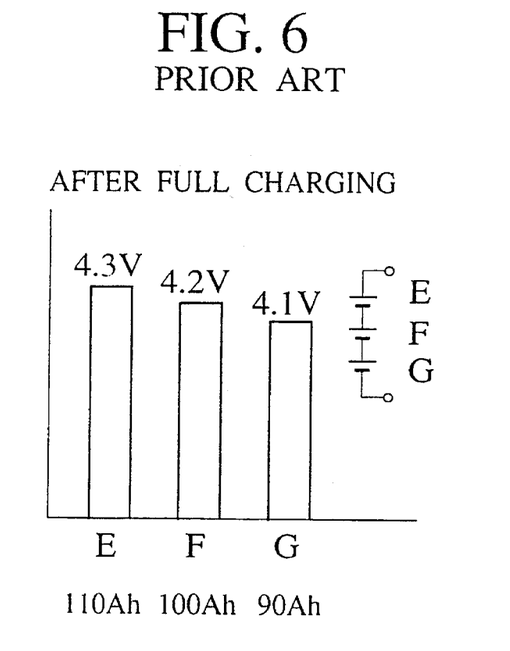
FIG. 6 is an explanatory diagram of voltage detecting level of the builtup battery of FIG. 5.

Referring to FIG. 6, we now suppose that a detected voltage value of a battery E is lower than the actual voltage thereof by 0.1 V (actual voltage at full-charging: 4.3 V); the detected voltage of a battery F is detected equal to the actual voltage (actual voltage at full-charging: 4.2 V); and that a detected voltage value of a battery G is higher than the actual voltage thereof by 0.1 V (actual voltage at full-charging: 4.1 V). Under the above condition, in case of using the full-charged lithium secondary batteries E (battery capacity: 110Ah), F (battery capacity: 100Ah) and G(battery capacity: 90Ah) as the series connection builtup battery, the usable battery capacity is limited to the smallest capacity of the three, i.e., 90Ah of the battery G, so that only 90% of battery capacity is effected in the battery F. Again, in this case, since the battery E is under the overcharging condition, the life span thereof is shortened at first of the three. In conclusion, the above-mentioned circuit has a problem of reduction of energy usable for the builtup battery due to the difference of voltage detection, whereby the life span of the battery is shortened.

SUMMARY OF THE INVENTION

It is therefore an object of the present invention to provide a series connection circuit for secondary batteries, which can prevent an amount of energy usable as the builtup battery from decreasing by compensating the difference of DOD among the batteries and the difference of voltage detection level among the voltage detectors etc., whereby it is possible to lower the tendency of shortening of life span of the batteries caused by its overcharging. The objects of the invention described above can be accomplished by a series connection circuit for builtup battery consisting of a plurality of secondary batteries which are connected in series with each other, each of the batteries having a terminal voltage changeable corresponding to a value of DOD (Depth of discharge: %), the circuit comprising:

voltage detecting means for detecting the terminal voltage of the secondary batteries thereby to calculate the respective values of DOD thereof;

discharge switching means for discharging the secondary batteries independently;

charging means connected with both ends of the builtup battery to charge the secondary batteries; and control means for controlling the independent discharging operation of the discharge switching means corresponding to the respective values of DOD obtained by the voltage detecting means.

With the arrangement mentioned above, owing to the control means to discharge the respective secondary batteries independently corresponding to the respective values of DOD thereof detected by the voltage detecting means, it is possible to equalize the values of DOD, whereby the reduction of usable energy caused by the increasing of difference of DOD can be prevented. The equalization of DOD by the independent discharging of the secondary batteries may be carried out just before charging of the builtup battery and thereafter, the charging may be started.

Alternately, even during discharging with an use of the builtup battery and when the difference of DOD of the secondary batteries is in excess of a predetermined value, the independent discharging of the respective batteries for equalizing the values of DOD may be carried out thereby to reduce the difference of DOD at charging and discharging of the builtup battery.

Further, regarding the equalization of DOD, it may be applicable to discharge the other batteries so as to adjust them to a specified secondary having the smallest voltage.

Furthermore, if the values of DOD are equalized within a range of 80 to 100%, the adjusting operation would be easy. Note, the charging means may change the charging operation into a constant voltage charging operation, after a full-charging condition is realized in any one of the secondary batteries.

According to the present invention, there is also provided a series connection circuit for builtup battery consisting of a plurality of secondary batteries which are connected in series with each other, each of the batteries having a terminal voltage changeable corresponding to a value of DOD, the circuit comprising:

a switch capable of switching the series connection of the secondary batteries to a parallel connection thereof;

charging means connected with both ends of the builtup battery to charge the secondary batteries; and control means for controlling the switch in such a manner that, just before charging the batteries, the series connection of the batteries is changed to the parallel connection thereof thereby to equalize the values of DOD and thereafter, the parallel connection is returned to the series connection again.

With the above arrangement, since the values of DOD can be equalized by switching the series connection of the secondary batteries to the parallel connection by the switch, thereafter the charging can be executed upon returning the series connection again.

Other objects and features of the present invention will become more fully apparent from the following description and appended claims taken in conjunction with the accompanying drawings.

BRIEF DESCRIPTION OF THE DRAWING

FIGS. 12A and 12B are views of a series connection circuit of secondary batteries in accordance with a fifth embodiment of the present invention, in which FIG. 12A shows a series connecting condition thereof and FIG. 12B shows a parallel connecting condition thereof;

DESCRIPTION OF THE PREFERRED EMBODIMENT

Embodiments of the present invention are now described with reference to the accompanying drawings.

Figure 7:
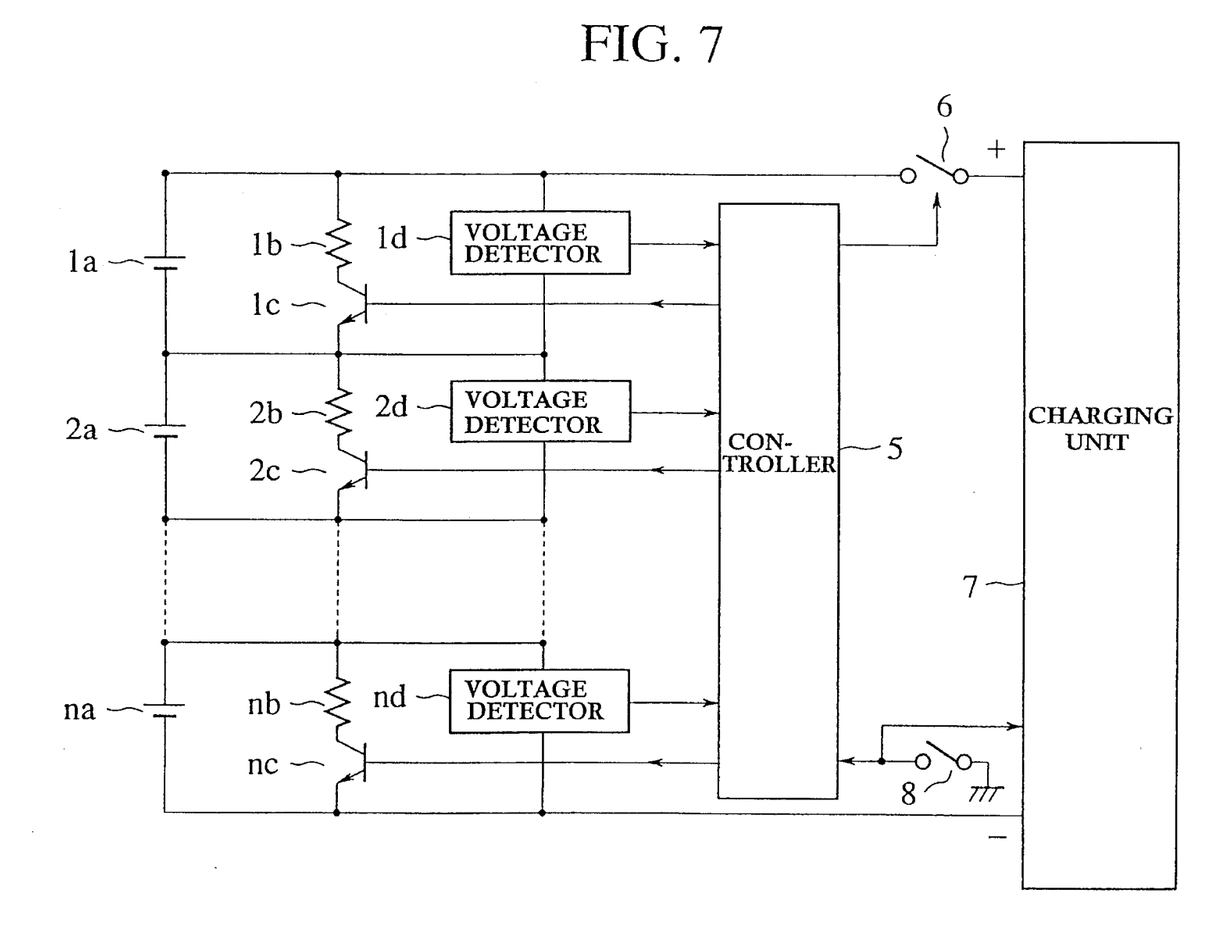
FIG. 7 is a view showing a series connection circuit of secondary batteries in accordance with a first embodiment of the present invention.

FIG. 7 shows a series connection circuit of secondary batteries in accordance with the first embodiment of the present invention. The circuit includes a plurality of secondary batteries $1a$, $2a$, and $na$ (n: natural number) which are connected in series with each other. Respectively connected in parallel with the secondary batteries $1a$, $2a$, ... and $na$ are discharge switching circuits which is also called "by-pass" circuits and which comprise discharging resistances $1b$, $2b$ ... and $nb$ and discharging transistors $1c$, $2c$, ... and $nc$ connected thereto in series, respectively.

Respectively connected in parallel with the secondary batteries $1a$, $2a$, ... and $na$ are voltage detectors $1d$, $2d$, ... and $nd$ which detect respective voltage values of the batteries $1a$, $2a$, ... and $na$. Inputting the voltage values detected by the detectors $1d$, $2d$, ... and $nd$, a controller calculates the values of DOD of the batteries $1a$, $2a$, ... and $na$ and then determines whether to output signals for activating the discharging transistors $1c$, $2c$, ... and $ns$ or not in order to discharge the batteries $1a$, $2a$, ... and $na$ independently. The series connection circuit further includes a charging unit 7 for charging the batteries $1a$, $2a$, ... and $na$, a contactor (switch) 6 activated by the controller 5 to bring the charging unit 7 into contact with the batteries $1a$, $2a$, ... and $ns$ and a charging switch 8 for starting the charging operation.

Figure 8:
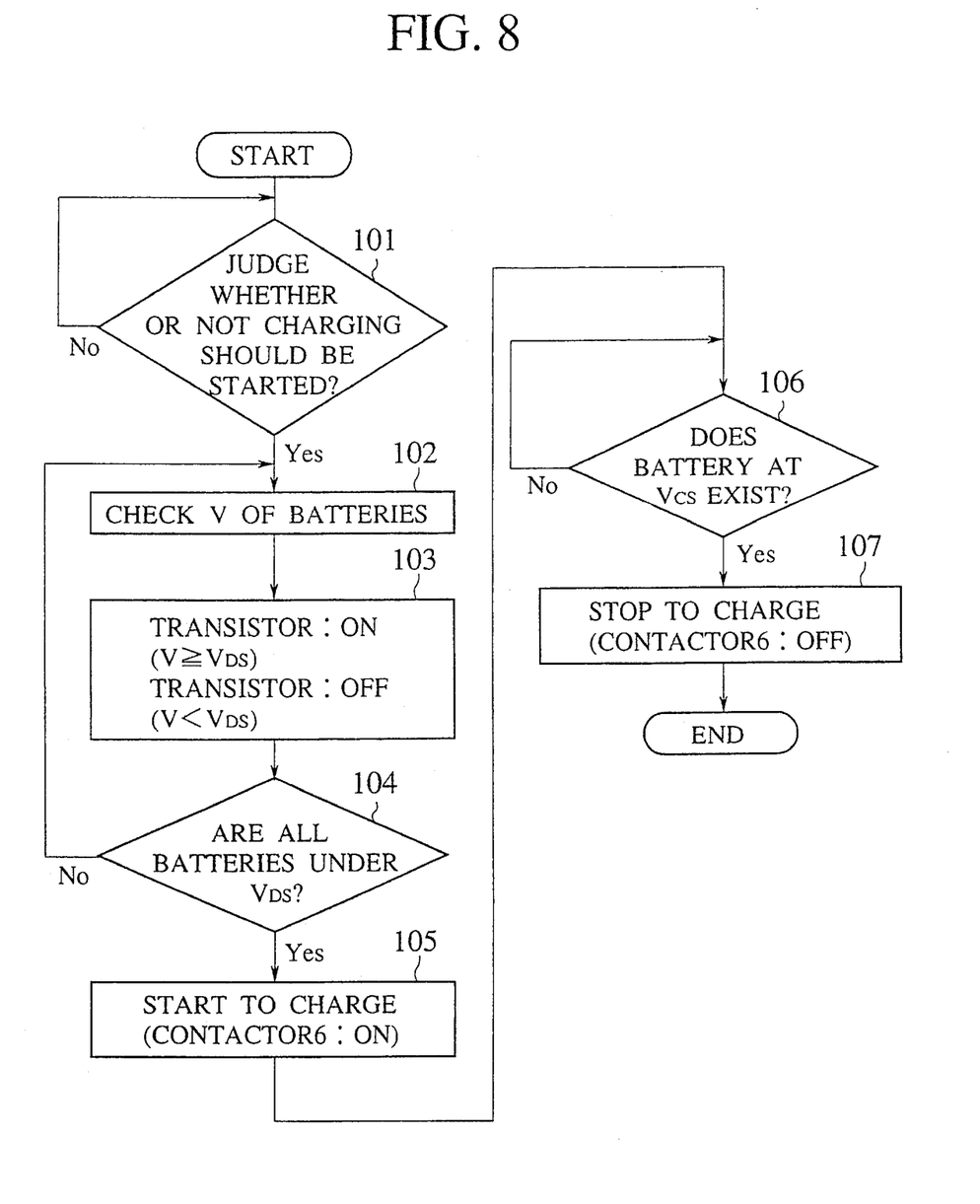
FIG. 8 is a flow chart of operations executed by the series connection circuit of FIG. 7.

FIG. 8 shows a flow chart of sequent operations carried out by the above-mentioned series connection circuit of FIG. 7. In FIG. 8, firstly at step 101, by the controller's checking of the conditions of the charging switch 8, it is judged whether or not the charging operation should be started. Note that, regarding this precess, the switch 8 may be switched on or off simultaneously with the connecting operation of the contactor 6 for connecting the batteries $1a$, $2a$, ... and $na$ with the charging unit 7.

Figure 9:
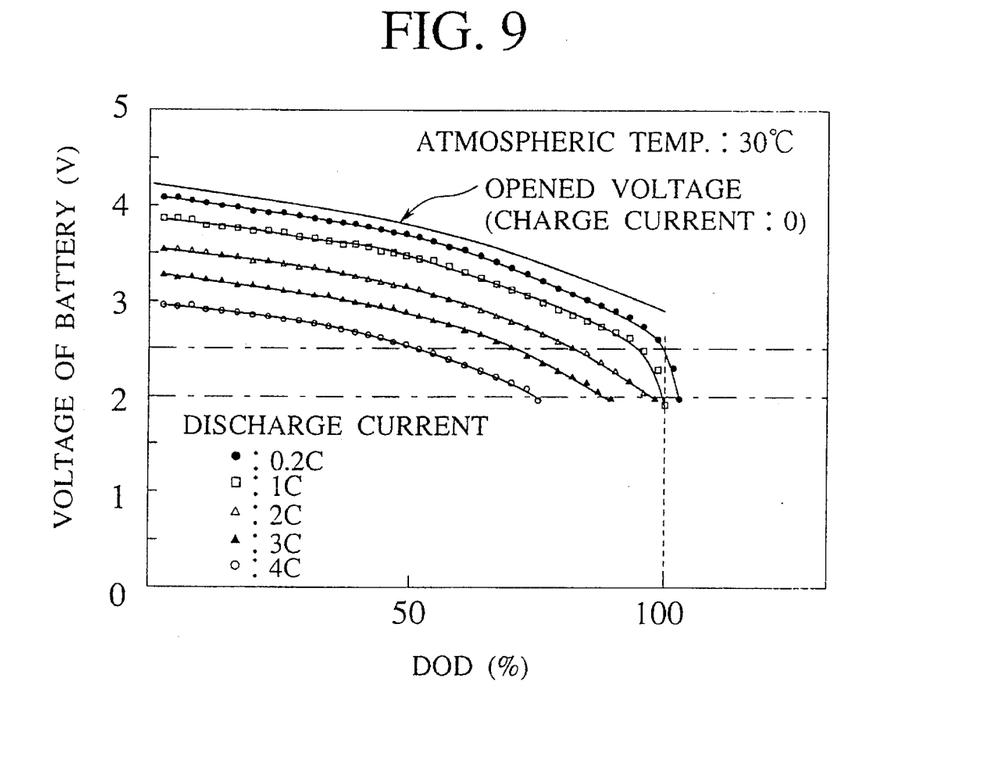
FIG. 9 is a characteristic diagram of discharging showing a relationship between values of DOD at discharging and voltage values of battery.

Then, when the charging switch 8 is switched on (ON state), that is, in case that the judgement at step. 101 is Yes, the routine goes to step 102 where the voltage values of the secondary batteries $1a$, $2a$, ... and $na$ are detected by the voltage detectors $1d$, $2d$, ... and $nd$, respectively, whereby the respective of DOD of the batteries $1a$, $2a$, ... and $na$ can be obtained. In detail, the values of DOD can be obtained by map-searching with a diagram of parameters of battery voltage and discharging current, such as FIG. 9. To cite an example of the secondary battery $1a$ of FIG. 7, in this individual discharging switching circuit under condition that the discharging transistor $1c$ is activated, the discharging current I can be obtained by an expression as follows:

$$I = V/R$$

where R is a resistance value of the discharging resistance $1b$ and V is a voltage of the secondary battery $1a$ detected by the voltage detector $1d$. Provided that the parameters I and V can be obtained in this way, then the value of DOD can be determined by map-searching with FIG. 9. Note that, the characteristics (curves) of the discharging circuit shown in FIG. 9 varies according to values of internal resistance of the respective secondary batteries and, in actual, the values of internal resistance are not identical to each other due to manufacturing dispersion of the batteries and respective deterioration rates thereof. Therefore, the above characteristics of the discharging circuit should be compensated by calculating the respective values of internal resistance from a load current and the respective battery voltage when discharging the electricity against the loads.

Note, although it depends on an object to be applied, it is possible to simplify the establishment of DOD considering that the respective secondary batteries have an identical internal resistance and by establishing a specified voltage that provides 100% of DOD under condition that the transistor for discharging is activated (ON).

Returning to FIG. 8, at step 103, it is executed to output control signals from the controller 5 to specified batteries (e.g. the battery $1a$) each of which has a relatively small DOD among the batteries $1a$, $2a$, ... and $na$ and which has a voltage value more than a predetermined discharge stop voltage Vds. Consequently, the discharging transistor $1c$ of the battery $1a$ is so activated that the electricity is discharged through the corresponding discharging switch circuit independently. On the other hand., for the batteries which has a relatively large DOD, i.e., a voltage less than the predetermined voltage Vds, the corresponding transistors are inactivated in order to avoid to shift for the overdischarging condition.

Then, at step 104, it is judged whether or not the respective values of voltage of the batteries reach the discharge stop voltage Vds, that is, the respective values of DOD are substantially identical to each other. If the respective values of DOD are not equalized yet, that is, when any one of the batteries has not reached the voltage Vds yet, the routine returns to step 102 where the above-mentioned process is executed again. On the contrary, if the respective values of DOD are equalized substantially, the routine goes to step 105. Note, at this time, all of the discharging transistors $1c$, $2c$, ... and $nc$ are switched off.

Upon completing the independent discharging operation for equalizing the respective values of DOD of the batteries, then at step 105, the contactor 6 is switched on by a signal from the controller 5, so that the charging voltage/current from the charging unit 7 is charged to the secondary batteries 1a, 2a, . . . and na.

At step 106, by a detection of the respective voltage values by the voltage detectors 1d, 2d, . . . and nd, it is judged whether or not there exists a specified battery which reaches a "designed" voltage which is determined by a chemical reaction between active materials of anode and cathode and organic electrolyte, namely a charge stop voltage Vcs, in the batteries 1a, 2a, . . . and na. If the judgement at step 106 is No, the routine goes to step 106 again. That is, within a period of time when any one of the batteries has not reached the voltage Vcs yet, the above-mentioned checking process at step 106 had been repeated. If the Judgement at step 106 is Yes, the routine goes to step 107 where the contactor 6 is inactivated to begin to charge the batteries 1a, 1b , . . . and 1n.

According to the above-mentioned embodiment, since a process of equalizing the values of DOD of the respective batteries is carried out by the independent discharging of the secondary batteries after discharging the batteries, i.e., using the batteries, the gradual reduction of usable energy as shown in FIGS. 1 and 3 can be excluded certainly, even though detecting errors of the detectors etc. are anticipated to a certain extent.

Figure 11:
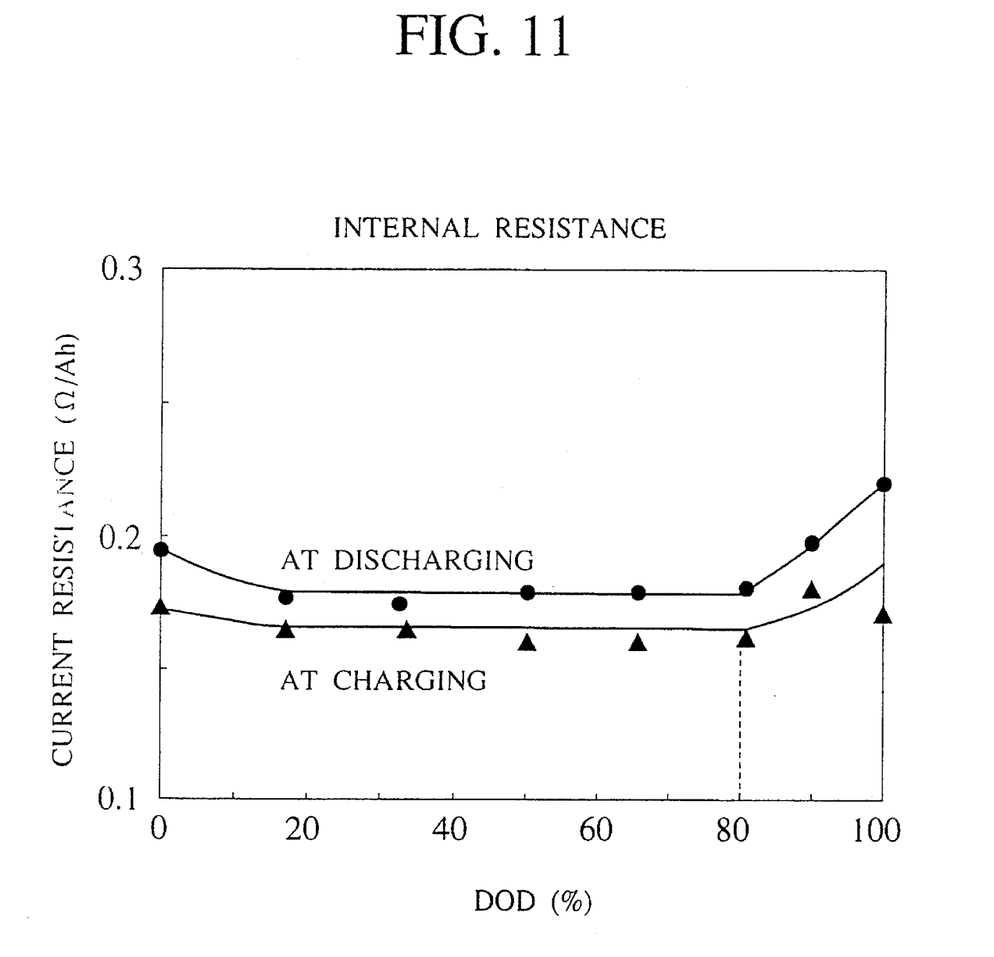
FIG. 11 is a diagram showing characteristic curves of DOD and internal resistance in accordance with a fourth embodiment of the present invention.

It is noted that, also in the conventional circuit shown in FIGS. 5 and 6, the values of DOD would be somewhat equalized since the Zener diodes operate to restrict the applied voltage and after it reaches the predetermined voltage, the charging current is decreased in order of magnitude of DOD. However, as shown in FIG. 11, since the internal resistance becomes to be larger at discharging rather than charging, the change of voltage with respect to changes of DOD would be larger at discharging from the relationship of V=I*R in comparison with that at charging, providing of the same current. Therefore, according to the embodiment, it is possible to further equalize the values of DOD in comparison with the above conventional circuit, even though the voltage detectors with the same accuracy are used in both cases.

Figure 10:
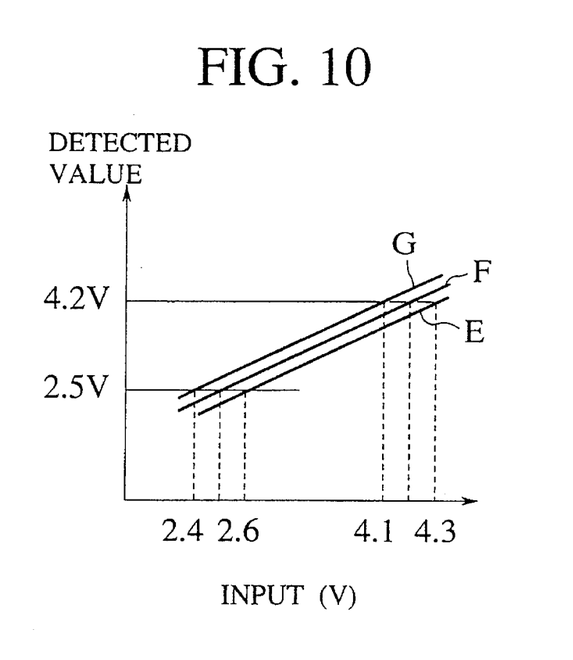
FIG. 10 is an explanatory diagram showing an example of the difference of respective voltage detection level of voltage detectors.

Furthermore, due to deviation of zero point of the voltage detector caused by thermal drift etc., even if there is produced a difference in its voltage detection level among the respective voltage detectors as shown in FIG. 10, since respective slope of voltage falls become to be gradually radically as the values of DOD increases as shown in FIG. 9, it is possible to easily decrease the unevenness of DOD by adjusting the zero point of the detectors in this area of large values of DOD.

In the second embodiment of the invention, as another process corresponding to steps 103 and 104 of FIG. 8 where, in the first embodiment, all of the batteries are to be discharged up to the discharge stop voltage Vds in order to equalize the respective values of DOD of the batteries 1a, 2a, . . . and na, the respective batteries may be discharged for a minimum of voltages of the batteries after discharging (using). In such a case, it is possible to shorten the time for charging the batteries, whereby an amount of energy necessary for discharging them can be saved.

In the third embodiment of the invention, instead of the processes at steps 106 and 107 of FIG. 8 where the charging operation is finished as soon as any one of the batteries realizes the predetermined voltage, i.e, the charge stop voltage Vcs in the first embodiment, the charging operation may be still maintained in such a manner that, upon holding on the output voltage of the charging unit 7 thereafter, the charging current for the batteries is gradually reduced in the charging condition with a constant voltage. In such a case, it is possible to prevent the batteries from overcharging due to over-voltage applied, whereby full-charging for all batteries can be attained smoothly.

Figure 12A:
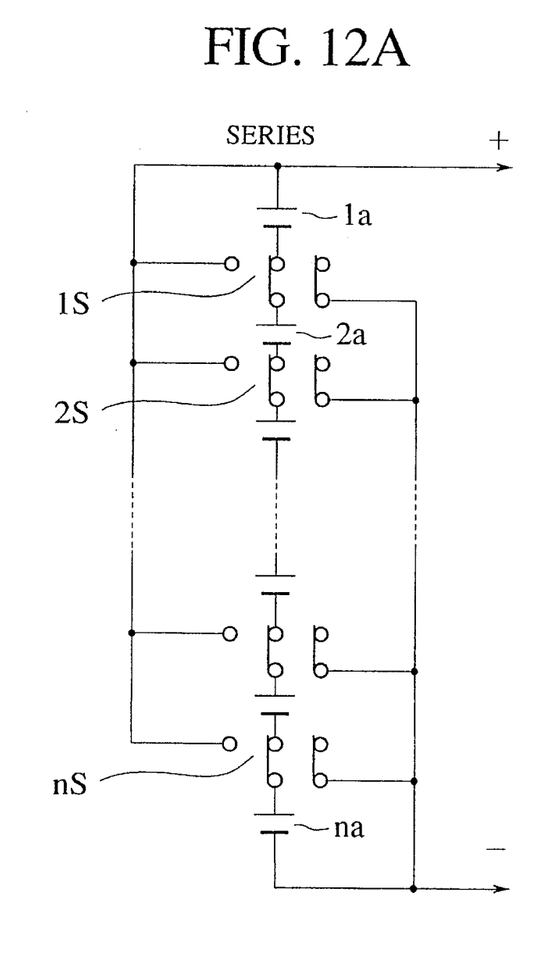
Figure 12B:
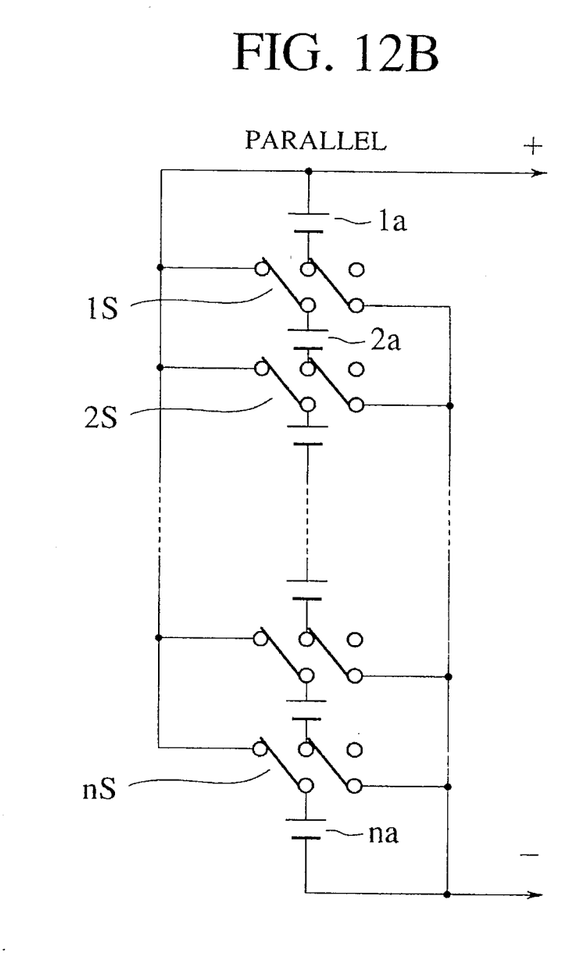

Next, in the fourth embodiment of the invention, instead of the processes at steps 103 and 104 of FIG. 8 where all of the batteries are to be discharged up to the discharge stop voltage Vds, the discharging operation for equalizing the respective values of DOD may be attempted within a range of 80% to 100% of DOD. FIG. 11 shows relationships between a character DOD of the secondary battery in accordance with the fourth embodiment and an internal resistance thereof. In the figure, since the internal resistance at discharging varies abruptly from 80% of DOD and then the changes of voltage is increased with respect to changes of DOD, there can be produced an effect to reduce errors in adjusting the values of DOD in spite of errors of the voltage detectors. FIGS. 12A and 12B show series connection circuits in accordance with the fifth embodiment of the invention. In the above-mentioned embodiments, the values of DOD of the secondary batteries are equalized by independent discharging through the respective switching circuits. On the contrary, in this embodiment, the values of DOD are equalized by changing a connecting form of the batteries 1a, 2a, . . . and na from series-connection to parallel-connection prior to charging the batteries.

This series connection circuit operates as follows. In charging, the series connection form shown in FIG. 12A is converted to the parallel connection form as shown in FIG. 12B by series/parallel turnable switches 1S, 2S, . . . and nS. Note, the lithium ion secondary battery has a character similar to a condenser. Therefore, if connecting a plurality of batteries with different values of DOD in parallel with each other, the values of DOD is equalized in comparison with a case of using lead batteries.

After equalizing the values of DOD by the parallel connection, the circuit is converted to the series connection of FIG. 12A by the switches 1S, 2S, . . . and nS, whereby the charging is started.

Figure 13:
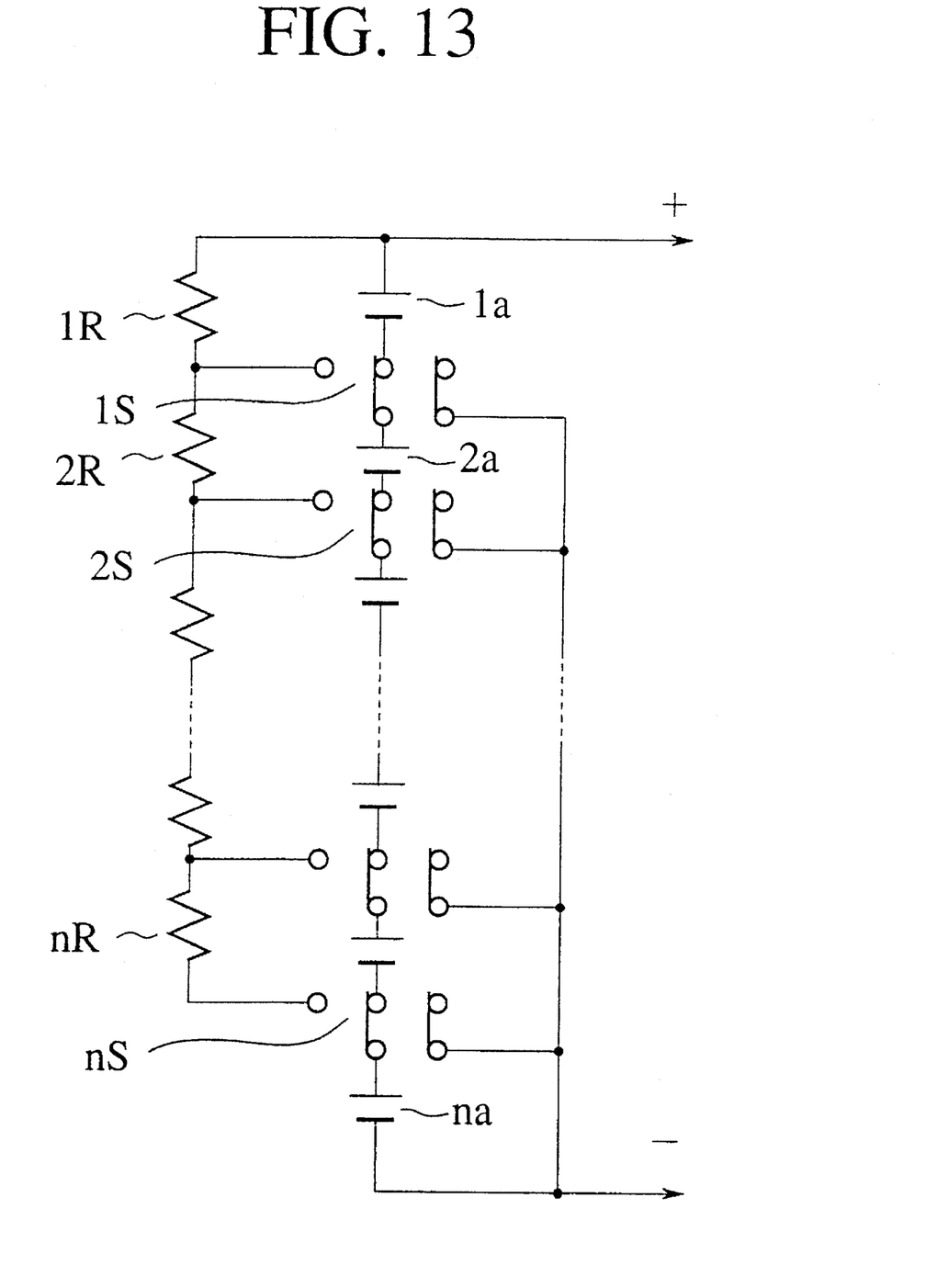
FIG. 13 is a view showing a modification of the fifth embodiment.

FIG. 13 shows a modification of the fifth embodiment, in which the above circuit further includes resistances 1R, 2R, . . . and nR arranged for preventing the circuit from overcurrent in the parallel connection.

According to the embodiments of FIGS. 12A, 12B and 13, since the ON/OFF control of the transistors by Judging whether or not the detected voltage is less than the discharge stop voltage Vds and the detection of voltage after discharging are deleted, the control can be simplified.

Figure 14:
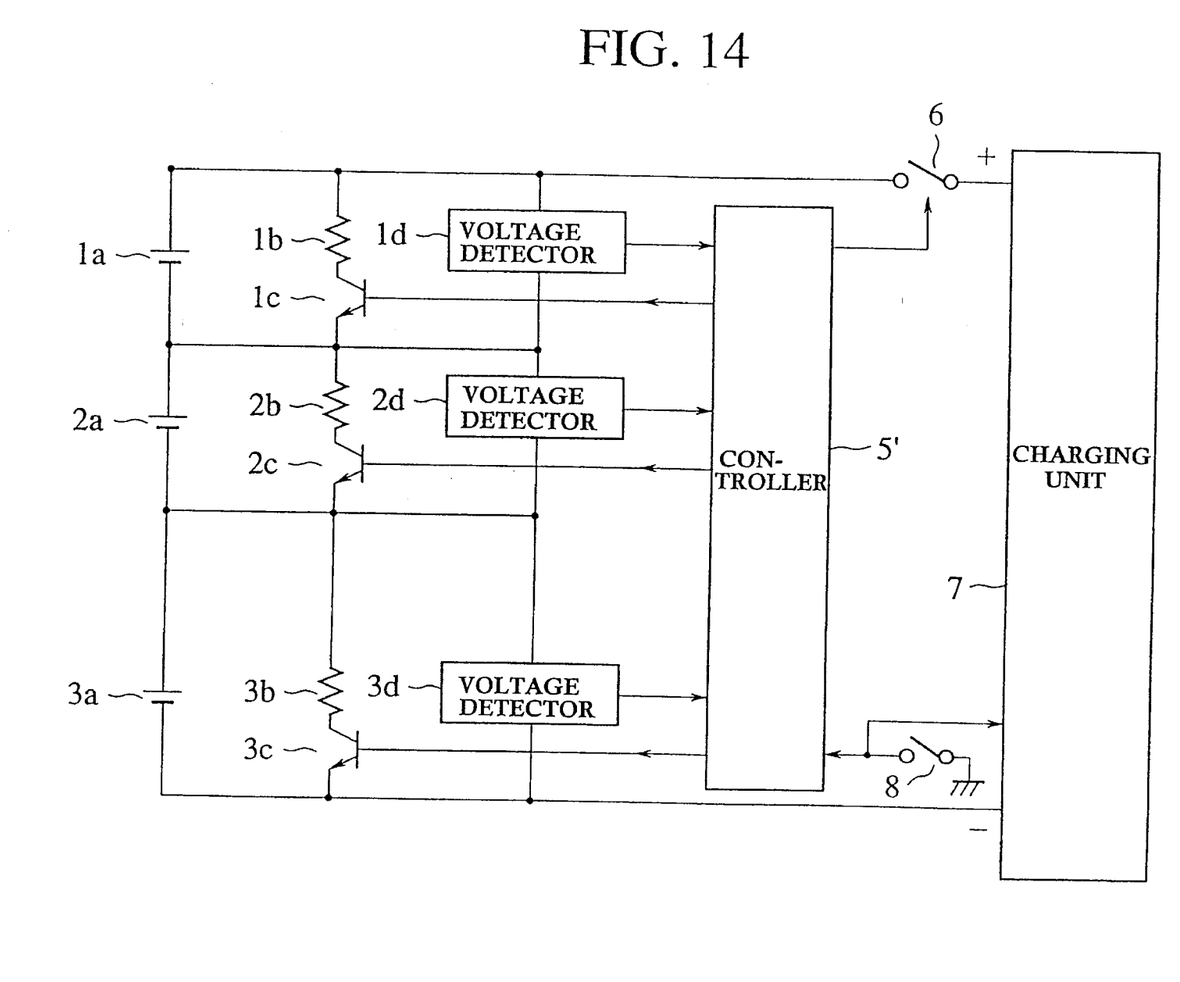
FIG. 14 is a view showing a series connection circuit of secondary batteries in accordance with a sixth embodiment of the present invention.
Figure 15:
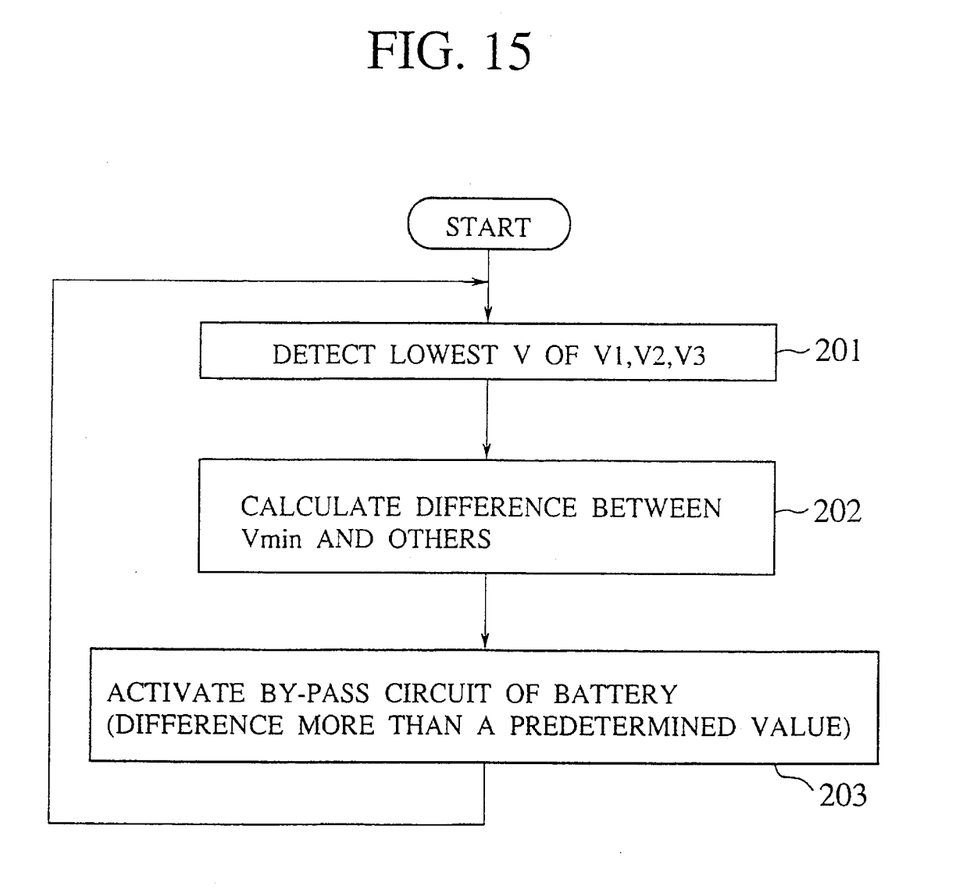
FIG. 15 is a flow chart of operations executed by the series connection circuit of FIG. 14.

FIGS. 14 and 15 show a sixth embodiment of the invention. Contrary to the previous embodiments where the values of DOD are equalized before charging, according to the embodiment, a controller 5' controls to equalize the values of DOD during discharging of the secondary batteries on use. To ease the following explanation, three batteries 1a, 2a and 3a are illustrated, connected in series with each other. The other structure is substantially the same as that of the first embodiment. FIG. 15 is a flow chart for executing the operations of the circuit.

First, at step 201, the lowest voltage Vmin is selected from the voltage values of V1, V2 and V3 of the batteries 1a, 2a and 3a by the controller 5'. Then, at step 202, it is calculated differences between the voltage Vmin of the battery (e.g. the battery 1b) and the other voltage values, respectively. At sequent step 203, against the battery (1a or 1c) of which the calculated difference at step 202 is more than a predetermined value, the transistor (3a or 3c) of the battery is activated thereby to discharge it independently, so that the difference of values of DOD is reduced. In this embodiment, the above mentioned precesses are always repeated.

With the operations mentioned above, since the values of DOD are equalized even when the batteries are on use (discharging for loads), the process for equalizing the values of DOD during charging can be eliminated. Note that, although this embodiment is applicable for either of the lithium secondary batteries and the lithium ion secondary batteries, it is not limited to only these batteries. It is a matter of course that this embodiment is applicable for a circuit with a battery having a characteristics similar to the above batteries in terms of relationships among the internal resistance, the series circuit of condenser, the voltage, the current and the time, such as a non-soluble secondary battery, a polymer-group of lithium battery and so on.

Finally, it will be understood by those skilled in the art that the forgoing description of the preferred embodiments of the disclosed structure, and that various changes and modifications may be made to the present invention without departing from the spirit and scope thereof.

What is claimed is:

1. A series connection circuit for builtup battery consisting of a plurality of secondary batteries which are connected in series with each other, each of said batteries having a terminal voltage changeable corresponding to a value of DOD (Depth of discharge: %), said circuit comprising:

voltage detecting means for detecting the terminal voltage of said secondary batteries thereby to calculate the respective values of DOD thereof;

discharge switching means for discharging said secondary batteries independently;

charging means connected with both ends of said builtup battery to charge said secondary batteries; and control means for controlling the independent discharging operation of said discharge switching means corresponding to the respective values of DOD obtained by said voltage detecting means.

2. A series connection circuit for builtup battery consisting of a plurality of secondary batteries, as claimed in claim 1, wherein said control means further controls said charging means so as to start the charging operation after the respective values of DOD of said secondary batteries are equalized by the discharging operation.

3. A series connection circuit for builtup battery consisting of a plurality of secondary batteries, as claimed in claim 1, wherein said control means controls the discharging of the respective secondary batteries so as to adjust them to a specified secondary battery having the smallest voltage thereby to equalize the respective values of DOD.

4. A series connection circuit for builtup battery consisting of a plurality of secondary batteries, as claimed in claim 1, wherein said control means controls the independent discharging operation for equalizing the respective values of DOD within a range of 80% to 100% of DOD.

5. A series connection circuit for builtup battery consisting of a plurality of secondary batteries, as claimed in claim 1, wherein, during discharging of said builtup battery against a load, said control means controls the independent discharging of the secondary batteries to equalize the values of DOD in case that a difference between the respective values of DOD is in excess of a predetermined value.

6. A series connection circuit for builtup battery consisting of a plurality of secondary batteries, as claimed in claims 1, wherein said charging means changes the charging operation into a constant voltage charging operation after a full-charging condition is realized in any one of the secondary batteries.

7. A series connection circuit for builtup battery consisting of a plurality of secondary batteries which are connected in series with each other, each of said batteries having a terminal voltage changeable corresponding to a value of DOD (Depth of discharge: %), said circuit comprising:

a switch capable of switching the series connection of said secondary batteries to a parallel connection thereof;

charging means connected with both ends of said builtup battery to charge said secondary batteries; and control means for controlling said switch in such a manner that, just before charging the batteries, the series connection of said batteries is changed to the parallel connection thereof thereby to equalize the values of DOD and thereafter, the parallel connection is returned to the series connection again.

* * * * *